(12) United States Patent
Salmre et al.

(10) Patent No.: US 8,171,138 B2
(45) Date of Patent: May 1, 2012

(54) SYSTEM AND METHOD FOR APPLYING FLEXIBLE ATTRIBUTES TO EXECUTE ASYNCHRONOUS NETWORK REQUESTS

(75) Inventors: Ivo W. Salmre, Aachen (DE); Friedrich van Megen, Aachen (DE); Alain Franck Pierre Gefflaut, Herzogenrath (DE); Wolfgang Manousek, Dormagen (DE)

(73) Assignee: Microsoft Corporation, Redmond, WA (US)

( * ) Notice: Subject to any disclaimer, the term of this patent is extended or adjusted under 35 U.S.C. 154(b) by 1397 days.

(21) Appl. No.: 11/058,949

(22) Filed: Feb. 15, 2005

(65) Prior Publication Data

US 2006/0184675 A1 Aug. 17, 2006

(51) Int. Cl.
G06F 15/173 (2006.01)
G06F 15/16 (2006.01)

(52) U.S. Cl. ........................................ 709/225; 709/227

(58) Field of Classification Search .................. 709/225, 709/227
See application file for complete search history.

(56) References Cited

U.S. PATENT DOCUMENTS

| | | | |
|---|---|---|---|
| 6,003,082 A | 12/1999 | Gampper et al. | 709/225 |
| 6,330,719 B1 | 12/2001 | Zigmond et al. | 725/121 |
| 2001/0010055 A1 | 7/2001 | Hirabayashi | 709/201 |
| 2002/0091763 A1* | 7/2002 | Shah et al. | 709/203 |
| 2002/0129016 A1 | 9/2002 | Christfort | 17/30 |
| 2003/0014521 A1* | 1/2003 | Elson et al. | 709/225 |
| 2003/0097443 A1 | 5/2003 | Gillett et al. | 709/225 |
| 2004/0019678 A1* | 1/2004 | St. Pierre et al. | 709/225 |
| 2004/0083286 A1* | 4/2004 | Holden et al. | 709/225 |

FOREIGN PATENT DOCUMENTS

| | | |
|---|---|---|
| EP | 1 349 339 A2 | 10/2003 |
| JP | HEI 07-049818 | 2/1995 |
| JP | 2002-300649 | 10/2002 |
| JP | 2004-274324 | 3/2003 |
| WO | WO/01/73569 | 10/2001 |

OTHER PUBLICATIONS

Office Action mailed Jun. 24, 2011, issued in JP Appl. No. 2006-024867, w/translation.
Office Action mailed Aug. 11, 2009, issued in EP Application No. 06100165.7.
Office Action mailed Nov. 7, 2008, issued in CN Application No. 200610005446.9, w/translation.
Office Action mailed Sep. 2, 2010, issued in CN Application No. 200610005446.9, w/translation.
Office Action mailed Dec. 14, 2011, issued in CN Application No. 200610005446.9, w/translation.
Office Action mailed Jan. 31, 2012, issued in KR Application No. 10-2005-0130581, w/translation.

\* cited by examiner

*Primary Examiner* — Jerry Dennison
(74) *Attorney, Agent, or Firm* — Merchant & Gould

(57) ABSTRACT

Flexible attributes are attached to network requests that may be executed asynchronously. Any number of criteria may be attached to network requests. The requests are queued until the associated criteria are satisfied. Once the criteria are satisfied, the request is executed. Applications that make the requests are provided with simple success and failure notifications that they can respond to with various logic. Any type of criteria may be attached to a request. The criteria may be associated with the requests at design time of the application using a graphical user interface.

20 Claims, 8 Drawing Sheets

SYSTEM AND METHOD FOR APPLYING FLEXIBLE ATTRIBUTES TO EXECUTE ASYNCHRONOUS NETWORK REQUESTS

BACKGROUND OF THE INVENTION

Mobile devices have become an integral part of an individual's life both at business and at home. Like desktop and laptop computers, there are now available rich applications to run on mobile devices.

Unlike desktop, and far more than laptop computers, mobile devices are constantly moving in and out of areas network connectivity. Additionally, these mobile devices, and in particular mobile phones, are generally always on and are constant companions of their users.

Typically, most of these devices are optimized to primarily work with one kind of wireless network such as a CDMA network, a GSM or UMTS network, a Wi-Fi network, and the like. The network connections established with these mobile devices, however, is not constant.

For example, mobile phone users travel in and out of zones of connectivity all day long. A person may be going above and below ground and entering in and out of buildings all day long. This movement results in losing network access from a few seconds at a time to longer periods of time as they move from point to point. Not only may the network access may be intermittent, the types of available networks may vary from location to location.

Many locations also have "dead spots" where network connections do not exist. For example, dead spots may occur in the centers of buildings as well as in elevators. Additionally, many modem workplaces offer their own private wireless networks (e.g. Wi-Fi) in addition to the public mobile phone networks. Switching between these different network options and dealing robustly with the temporary absence of network connections is problematic for software applications running on the devices.

Some locations are configured to prevent access to wireless networks as matter of policy. These restricted areas include locations such as: airplanes; government embassies and offices around the world; as well as other secure areas. The end result is that ubiquitous connectivity for mobile devices does not exist. This is markedly different from desktop or laptop connectivity. Connectivity may be always near a user, but it is often missing at a user's exact location.

SUMMARY OF THE INVENTION

Embodiments of the present invention are related to applying flexible attributes to execute asynchronous network requests.

According to one aspect of the invention, any number of criteria may be attached to network requests. Upon submission of the request, the requests is queued until its associated criteria are satisfied. Once the criteria are satisfied, the request is executed. Applications that make the requests are provided with success and failure notifications that they can respond to with various logic. For example, when the request succeeds a success event is returned to the application and when the request fails a fail event is returned to the application.

According to another aspect of the invention, any type of criteria may be attached to a request. For example, the criteria may be network related (bandwidth, link quality, type of link, etc . . . ), location related, time related (execute request at particular time), and the like.

According to yet another aspect of the invention, the criteria may be associated with the requests at design time of the application using a graphical user interface. Alternatively, the criteria may be associated with the request using an API. The user interface is directed at providing an easy way to make declarative statements about how to handle network requests.

DETAILED DESCRIPTION OF THE PREFERRED EMBODIMENT

Generally, embodiments of the present invention are related to applying flexible attributes to execute asynchronous network requests. Criteria may be attached to network requests. Upon submission of the request, the requests is queued until its associated criteria are satisfied. Once the criteria are satisfied, the request is executed. Applications that make the requests are provided with success and failure notifications that they can respond to with various logic. For example, when the request succeeds a success event is returned to the application and when the request fails a fail event is returned to the application.

Any type of criteria may be attached to a request. For example, the criteria may be network related (bandwidth, link quality, type of link, etc . . . ), location related, time related (execute request at particular time), and the like. The set of possible Criteria is designed to be extendable by the programmer.

The criteria may be associated with the requests at design time of the application using a graphical user interface. Alternatively, the criteria may be associated with the request using an API. The user interface is directed at providing an easy way to make declarative statements about how to handle network requests.

Illustrative Network Criteria System

Figure 3:
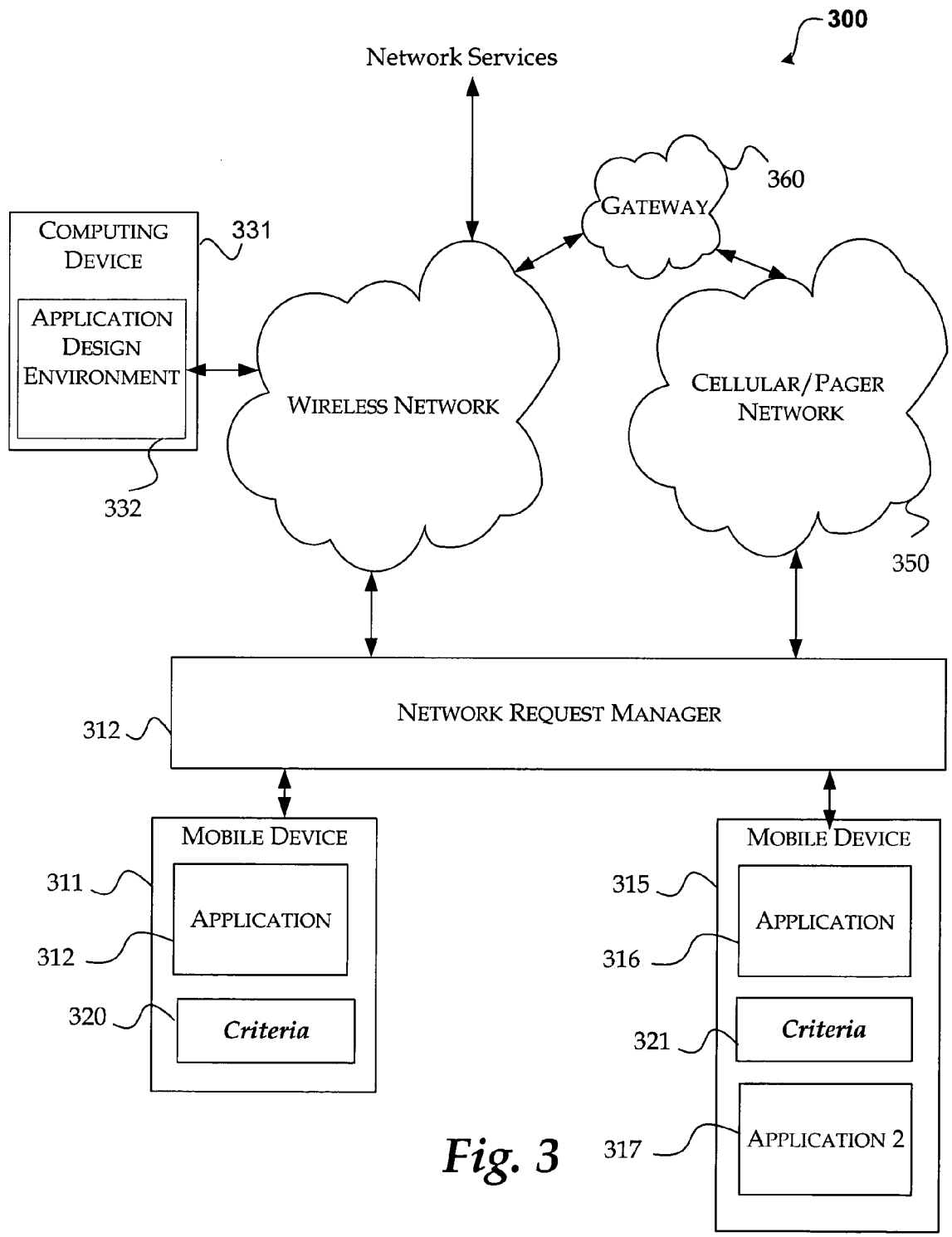
FIG. 3 is a functional block diagram generally illustrating a network request criteria system.

FIG. 3 is a functional block diagram generally illustrating a network request criteria system 300, in accordance with aspects of the invention. Generally, system 300 is directed at allowing an arbitrary number of criteria to be attached to network requests, to queue the requests, and to execute them efficiently when the needed criteria are met.

Figure 1:
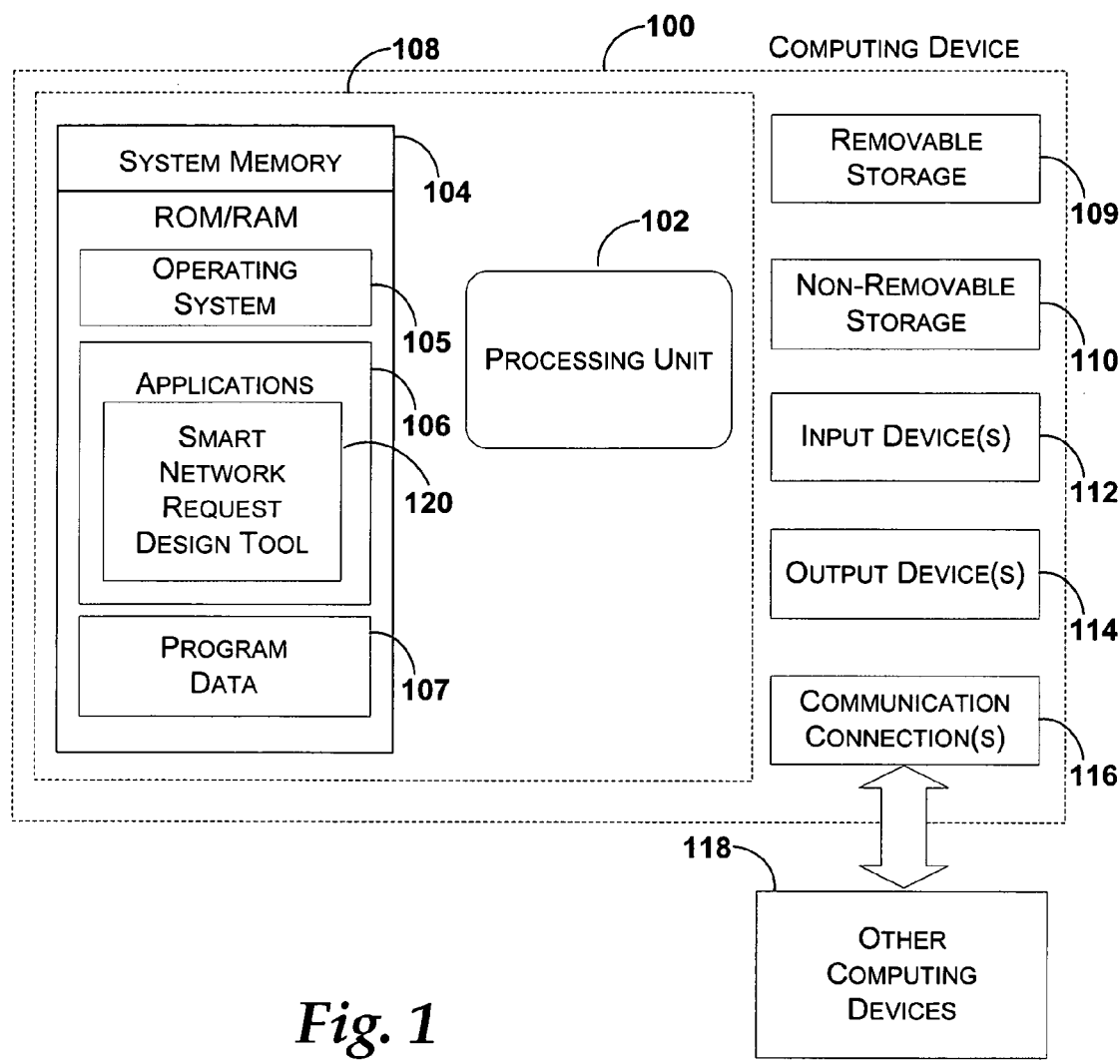
FIGS. 1 and 2 illustrate an exemplary computing devices that may be used in exemplary embodiments of the present invention.
Figure 2:
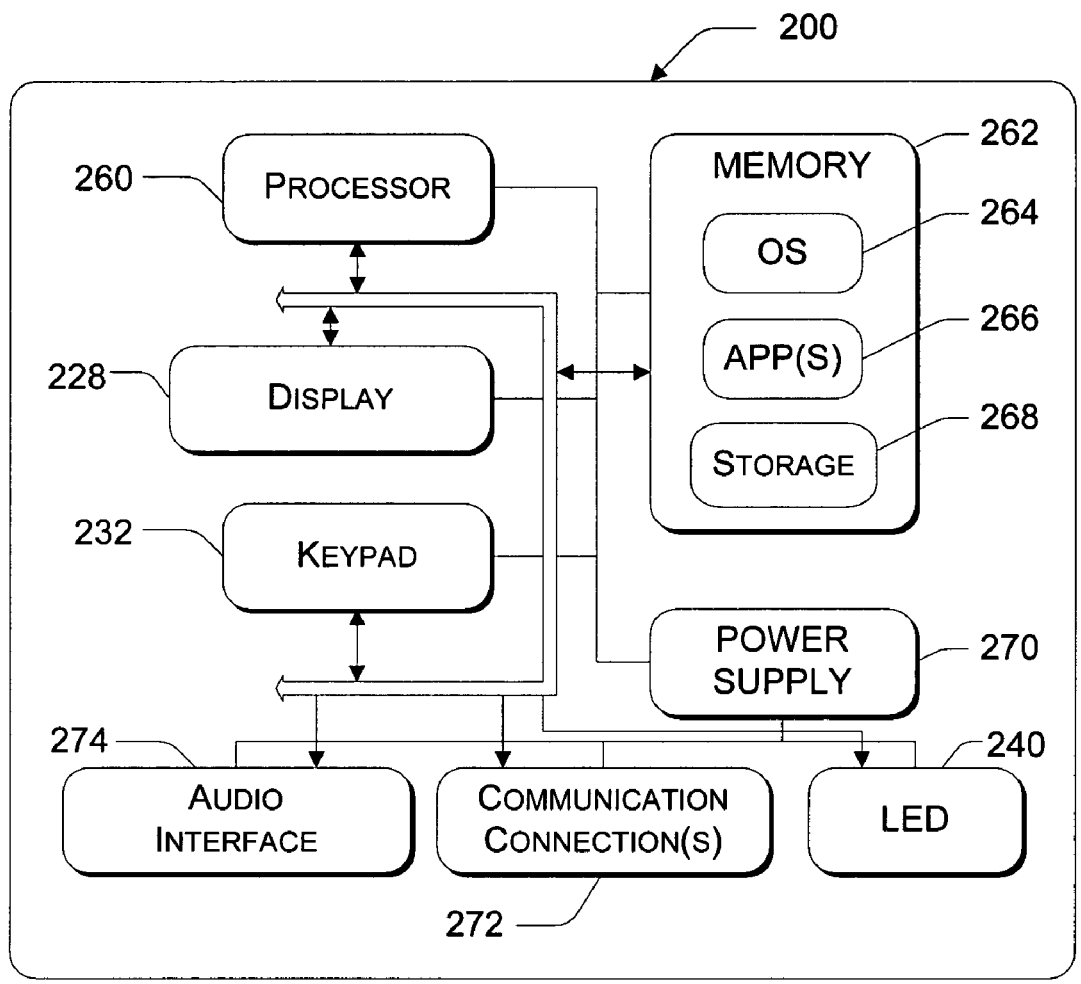

Computing device 331 is a computing devices such as the one described in conjunction with FIG. 1 and mobile device 311 and mobile device 315 are mobile computing devices such as the one described in conjunction with FIG. 2.

Computing device 331 is configured to run an application design environment (332) that is directed at configuring and associating criteria with network requests, such as the network requests used within applications 312 and 316, 317 running on devices 311 and 315. Generally, application design environment 332 allows a user to graphically configure their communications needs, set criteria, and then write communications code to respond to the network requests. An event-driven run-time model for dealing with queued network requests and getting event notifications for both communications successes and failures. According to one embodiment of the invention, design environment 332 is a graphical user interface that allows a user to configure and associate criteria with network requests (See FIGS. 7 and 8 and related discussion).

Applications 312, 316, and 317 may have zero or more criteria (320, 321) associated with them. The criteria may represent any desired condition. For example, a criteria may be a low level requirement, such as the signal strength must be greater than a predetermined level before attempting to send or retrieve information, or a complex high level requirement, such as the mobile device must be physically located inside a specific location; the user must have a security token attached to the device, the time must be between 9AM and 5PM and the server named "MYSERVER-14" must be accessible. By being able to define criteria of arbitrary complexity, relating to different requirements and corresponding to both low and high levels of technical abstraction, application developers are given the flexibility in using these criteria declaratively.

Applications 312, 316 and 317 may also dynamically view the queued requests and make simple determinations of which criteria have been met and which remain unmet; this information can be used to direct either programmatic or end-user action to remedy the situation. For example: An application can inform the user that they request has not been processed because the signal strength is too low for reliable and efficient communication. Based on this information, the user may decide to move to a location with better signal strength and have the request automatically run when the needed criteria are met. The set of criteria (320, 321) is extensible. A programmer can create additional criteria and use them like the predefined criteria and attach them to requests.

These declarative criteria (320, 321) may be dynamically responsive to changing conditions. A given criteria established by a user (e.g. "the server XXXX must be reachable", "the bandwidth must be greater than 512 kbit") can be tied to multiple network requests. If the criteria is found untrue in one test, it can be applied to all requests that have that criteria attached to them without the need to test the condition repeatedly or for each request. In this way, common criteria only need to be checked one time.

Similarly if a criteria is determined to be true by network request manager 312, it does not need to be retested over and over again for each request. The criteria can simply be assumed to be true until proven otherwise. In general, smart criteria can distinguish between intermittent and final failure/success and the application is able to take advantage of this information to make intelligent communications decisions.

As discussed above, criteria may be grouped. The grouping of criteria not only allows a user to create more complex expressions but also allows the user to link criteria. For example, consider declaring a requested link speed criteria of 10 Mbs and a declaring a link type criteria of "not Wi-Fi". If the device currently has a GPRS connection and a Wi-Fi connection then the link speed criteria of 10 Mbs would be met by the Wi-Fi adapter but the "not Wi-Fi" criteria would not be met by the GPRS connection. Being able to group and link criteria allows rich statements to be made about acceptable connection conditions.

Figure 4:
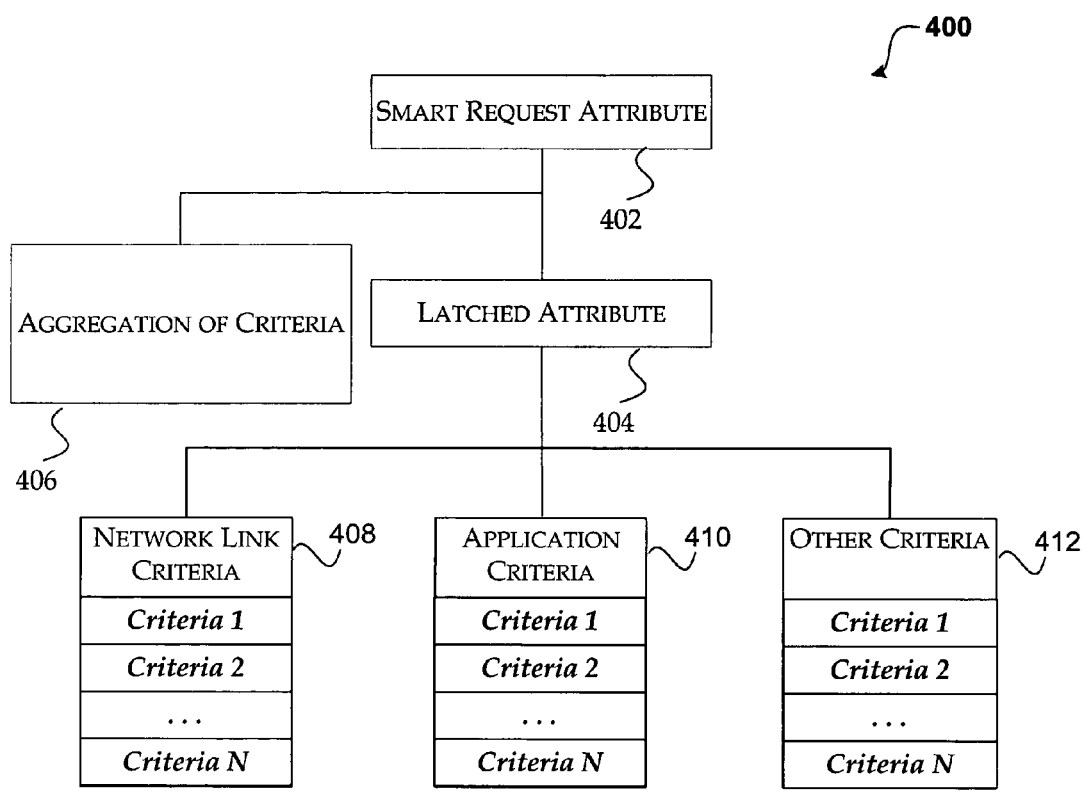
FIG. 4 shows a tree of example criteria that can be applied to a queued network request.
Figure 5:
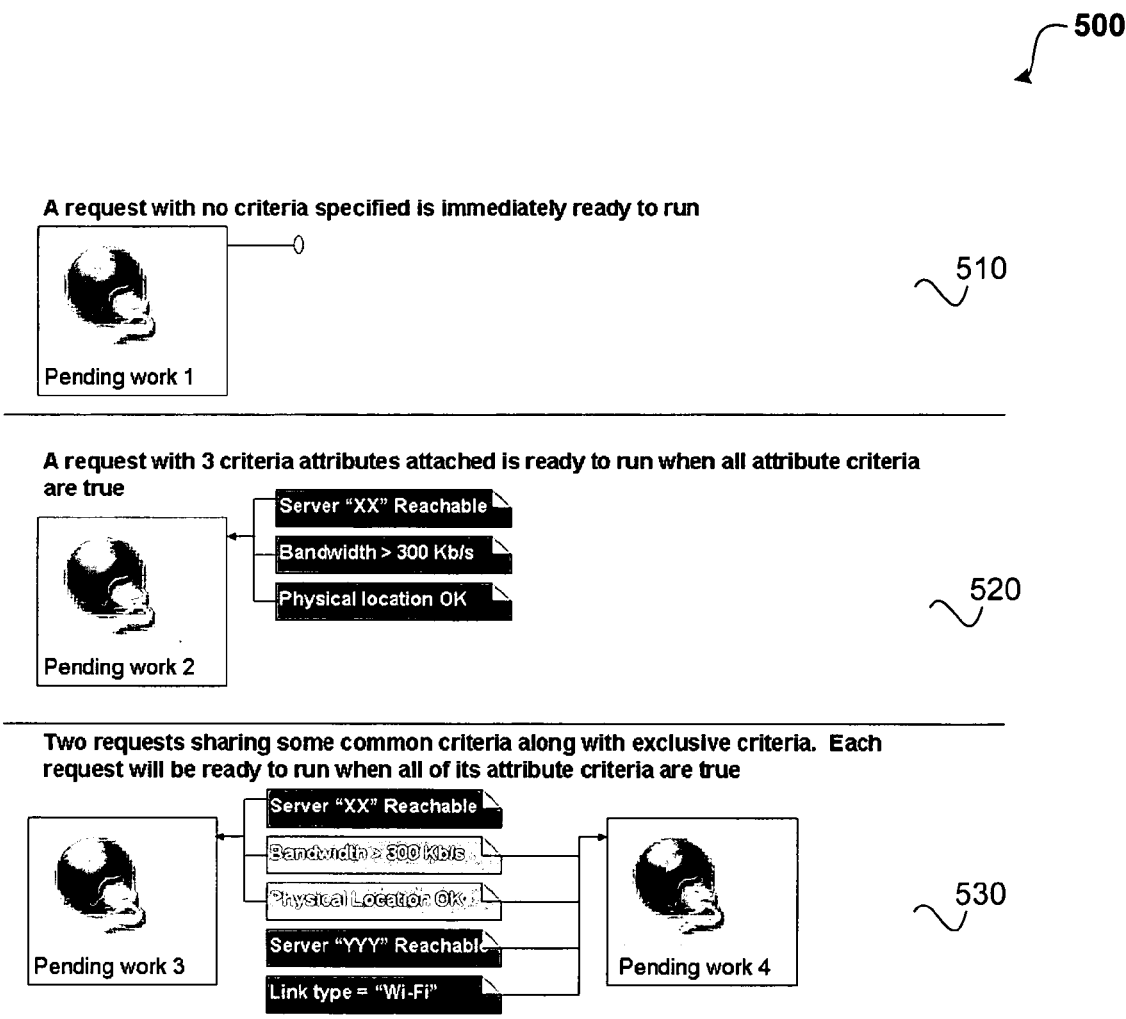
FIG. 5 illustrates several smart network requests having different criteria attributes associated with them.
Figure 6:
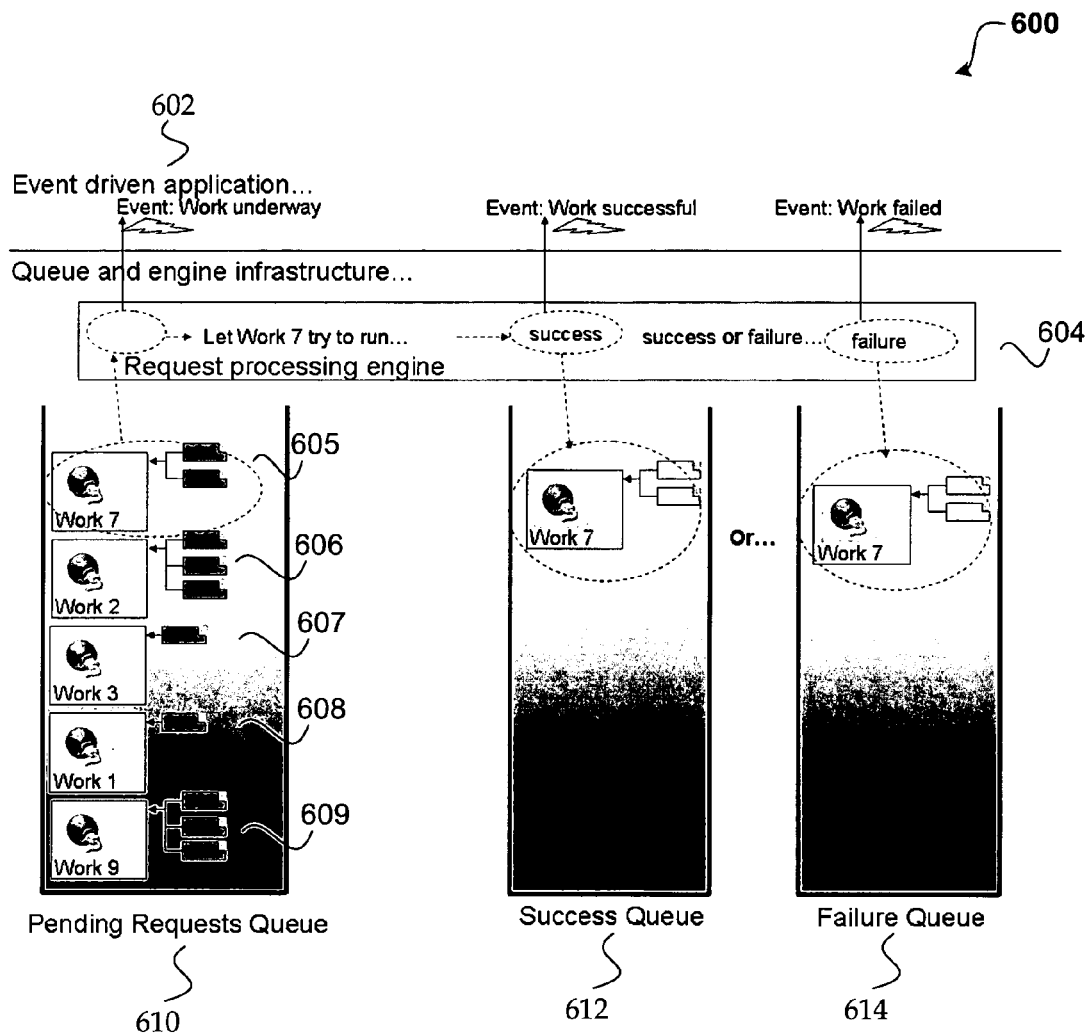
FIG. 6 shows runtime behavior of a network request manager.

Some of the criteria may be shared between applications, while other criteria may be unique to each application (See FIGS. 4-6 and related discussion).

Generally, network request manager 312 is configured to execute network requests when any criteria that are associated with the requests is satisfied. Network request manager 312 obtains the attributes associated with the criteria and determines when they are satisfied (See FIG. 6 and related discussion).

The network request manager (312) interacts with network services through various protocols. For example, network request manager 312 could use sockets, HTTP requests, or Web Service requests.

By utilizing network request manager 312 an asynchronous communications model may be used by the applications (312 and 316, 317). Sockets, HTTP and Web Services communications models were developed and refined for use on desktop and server computers. Application developers who "attempt to open a communications Socket" rely on a synchronous programming model and generally assume that the network infrastructure is in place and operative. This is generally true for desktop and server computers but much less so for mobile devices.

Cellular/pager network 350 is a network responsible for delivering messages to and receiving messages from wireless devices using a cellular network. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and wireless network 340. For example, a computer user may send a message that is addressed to a cellular phone. Gateway 360 provides a means for transporting the message from network 340 to cellular/pager network 350. Conversely, a user with a device connected to a cellular network may be browsing the Web. Gateway 360 allows hyperlink text protocol (HTTP) messages to be transferred between network 340 and cellular/pager network 350.

The following example scenarios illustrate various uses of the system. Suppose that a user, John lives by his mobile phone depending on it to deliver information and services on-demand. John frequently travels in his city during the day, going to meetings all over town, and is also often on business trips. He already keeps his schedule and contacts on his mobile phone and desires intelligent services to help him with his life. John is also information obsessed and hates wasting time. He wants his mobile phone to keep up with him and serve his information and services needs throughout the day. To aid him, his mobile phone has a series of custom applications on at that provide needed information and services to him.

John wakes up in the morning and glances at his daily schedule on his mobile phone before he goes to work. Reading the news on the way to work: John enters the subway and is in and out of network connectivity during the trip. While waiting for his train, he takes out his mobile phone and runs the "news clippings" application. Because John has Wi-Fi at home and smart mobile application that can utilize it, the latest headlines John is interested in are already downloaded to his phone. He scans though various news items and reads the cached articles. He spots a link to an article for "Emerging Digital Pets" that he is interested in and notices that it has a green link, which indicates that the content has not been cached. He clicks on the link to indicate that he would like the article to be downloaded for him when possible. When John makes this request, the network request manager queues the request and determines if the criteria associated with the request are met. When the criteria are met that are associated with the news clipping application, the request is processed whenever the network conditions permit. Since John is in an area of no connectivity, the request may not be satisfied at this time. Once John's train emerges from below ground and travels above in the open air for several minutes the device is able to establish a GPRS connection for John and the network request manager executes the queued request and the application downloads the requested news items into the news clippings queue. When the work is completed the application receives a programmatic event from the network request manager that queued work has been successfully completed. Responding to this event the application displays unobtrusive "news downloads complete" icon at the bottom of the news reader to indicate that a requested article has been downloaded. John finishes the article he is reading now and then switches to the news downloads and reads the articles about "Emerging Digital Pets" and "South American Ski vacations". Meanwhile the train has gone back below ground and network connectivity has been lost again—John is unaware and unaffected by this. Reading the article about "Emerging Digital Pets" John decides he would like to go see one in action. The article offers a "click here for a store near you" link. John clicks on the link and a request is logged using John's current location. Because John is off-line the request is cached locally and will be sent when he is back in acceptable network terrain. John is only aware that the request has been logged and will be processed whenever it can; he does not need to re-log the request himself. John's train soon arrives at work.

A change of schedule while at work: While at work a phone call comes in for John. Based on this phone conversation he agrees to a meeting later that afternoon in across town. The organizer of the meeting sends him a SMS message containing the location of the meeting. John's scheduling application sees that he has a new meeting a few hours across town and queues a network request to download a detailed map of the area of the meeting. Since John's phone is at work it has access to the Wi-Fi network there it can immediately start downloading the requested maps and caching them on the device. This work consists of a series of network requests (e.g. a series of individual requests for various maps and directions); all of this work is queued and starts running when its requirements are met as determined by the network request manager. In the middle of requesting and downloading the maps John walks into an elevator, the doors close and his network connection is lost. The network failure is detected by the network request manager and the interrupted work is placed back onto the network request queue (along with the other work there) to be handled when a suitable network connection is restored. Several minutes later after John has existed the elevator and his phone again has Wi-Fi network access the phone briefly wakes up from its low power mode an downloads the remaining requested maps.

Another example is a user desiring to download music files. While the user is shopping for music on their mobile phones and queuing up tracks they want to download the download can take place in the background. If the download for all songs can not complete before the connection is lost due to the mobility of the user the downloads will be resumed later. The user can even continue shopping for music while disconnected and queue up requested downloads.

FIG. 4 shows a tree of criteria that can be applied to a queued network request, in accordance with aspects of the present invention. According to one embodiment, the criteria are derived from an abstract SmartRequestAttribute class (402). As discussed above, criteria can relate to many different items. For example, one set of criteria may be network link criteria (408). Some network link criteria include, but are not limited to link speed, link type, available bandwidth, IP Address, and the like. An application layer criteria (410) includes an item such as whether a particular server reachable. Miscellaneous criteria (412) may include a variety of items such as physical location, time of day, the outcome of previously completed requests, either success or failure, cost, security, and the like. Any type of criteria may be attached to a request. A programmer could add criteria based on a variety of factors. For example, a programmer could add a set of criteria that related to the features of network cards, networks used, locations visited, and the like.

As discussed above, common criteria may be checked a single time by the request manager, thereby saving available resources. The criteria collected may also be aggregated (406). Different criteria may also be grouped together to create relationships between various criteria (404).

FIG. 5 illustrates several smart network requests having different criteria attributes associated with them, in accordance with aspects of the invention.

These criteria attributes can be shared between requests, meaning that an attribute that holds true for one request can be assumed to be true for others and conversely if it is false for one request it can be assumed false for all requests. In this regard attributes can be shared and can be latched. This latching behavior is particularly valuable for attribute criteria that are expensive to test. An example of such a criteria is an attribute that tests whether a given service on a server is reachable. The only way to definitively know if a specific server service on a network is reachable is to try to contact that server and to determine when an acceptable response is returned. On a mobile network such a request can be high latency, require considerable battery power and can incur a monetary cost when performed. For these reasons, if an attribute criteria is determined to be true, it is latched into the true position until proven false or reset by application logic. Requests sharing this attribute can benefit from this smart behavior.

Referring to the first request in FIG. 5, request 510 does not include any criteria that needs to be met. Therefore, request 510 is ready to run immediately.

Request 520 includes three different criteria that must be met before it is run. The criteria that must be met before request 520 is run includes that server "XX" is reachable, the bandwidth of the connection is greater than 300 Kb/s, and a physical location constraint is met. When all of these criteria are met, request 520 is run.

Request 530 show two different work requests (pending work 3 and pending work 4 that share common criteria. The shared criteria are the physical location criteria and the bandwidth criteria. While the two pending work units include some common criteria, they may also include criteria that is unique to each one. For example, pending work 3 requires that server "XX" be reachable, whereas pending work 4 requires that server "YYY" is reachable along with the link type being a "Wi -Fi" link.

FIG. 6 shows runtime behavior of a network request manager, in accordance with aspects of the invention. Each application, such as application 602, that is coupled to network request manager 604, places work onto pending requests queue 610. According to one embodiment, each network request is initially placed onto the pending requests queue. As illustrated, pending requests queue 610 includes five work requests, including work 7, work 2, work 3, work 1, and work 9. Each work item includes zero or more "criteria attributes" (See labels 605-609). Periodically, the request manager (604) looks at the work items in the queue and determines which items are ready to execute. An item of work is ready to be executed if all of its criteria attributes are true. When the criteria attributes are true, the item is removed from pending requests queue 610 and its code is executed in a controlled environment that can detect failure. According to one embodiment, the requests are performed as soon as the criteria associated with the request is satisfied. As the work is started, an asynchronous event is fired to the client application (602) so that the application can perform some action, such as notifying the user or taking some other appropriate action. The work executed will either succeed or fail. The work is placed into a success queue (612) or the failure queue (614) after execution and the application (602) is notified of success or failure via an asynchronous event. According to one embodiment, the events include, work underway, work successful, and work failed.

While a request is within system 600, an application (602) can examine what work is presently on the pending requests queue 610, and what the status of each of a work item's attribute criteria are. For example, the application that submitted the work 2 request could inquire the status of criteria attribute number 2.

An application may also remove work from the pending work queue if it no longer makes sense to run the task. For example, a user may have requested a new communications task that supersedes existing work that has already been requested. A simple function call may be used to remove the work from the queue.

Similarly to the pending requests queue, applications can also examine what work is in the success queue (612) or the failure queue (614). When desired, the application can move work currently in the failure queue (614) back to the pending requests queue (610).

Figure 7:
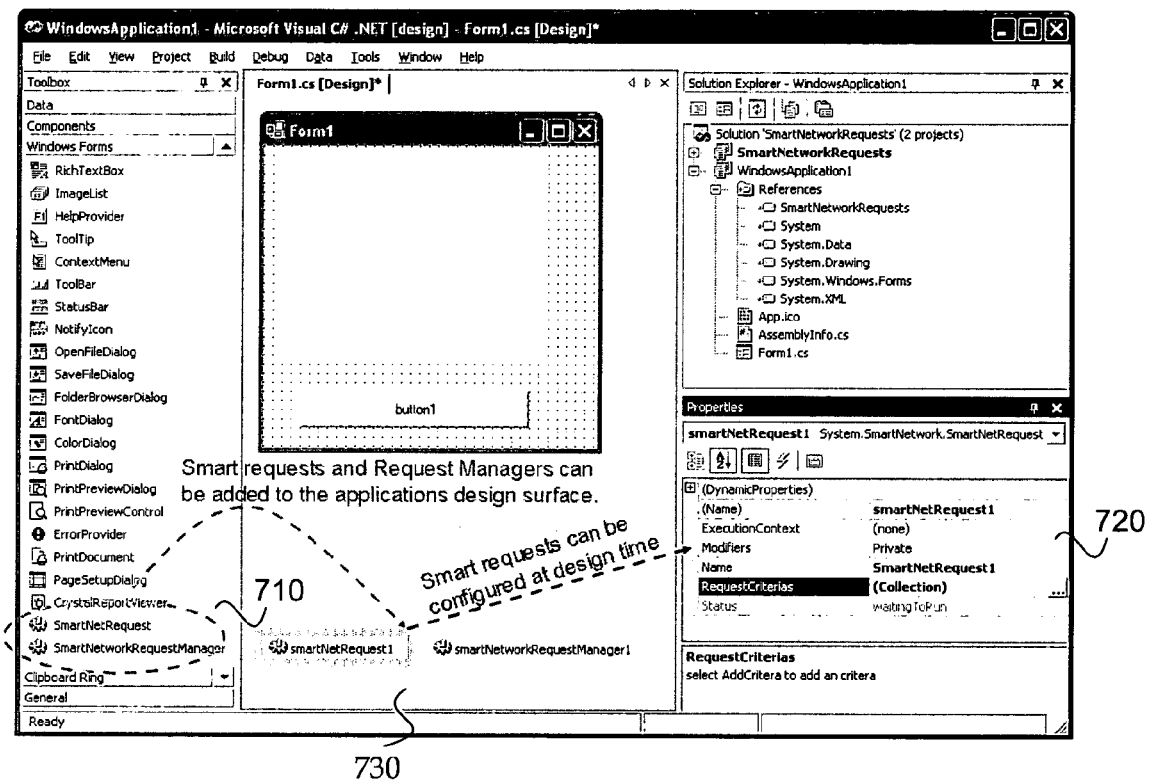
FIG. 7 illustrates an exemplary user interface for configuring smart requests.

FIG. 7 illustrates an exemplary user interface for configuring smart requests, in accordance with aspects of the invention.

As can be seen by referring to ellipse 710, both SmartNetworkRequests and the SmartNetworkRequestManager can be added to the application design surface (730) and configured by the software developer in the properties portion (720) of the user interface. Using user interface 700, the developer may configure the Network Request Manager's run-time behavior. For example, behaviors such as how many requests can be run in parallel in the background can be configured.

Developers may also write code to respond to the events provided by the request manager. For example, code may be written to respond to events such as: a SmartNetworkRequest getting taken off the "pending requests queue" and being run, a SmartNetworkRequest succeeding and a SmartNeworkRequest failing.

A user may configure SmartNetworkRequests by dragging and dropping them on the design surface (730). Each SmartNetworkRequest represents a communications task that the developer wants to run when specified criteria are met. Similar to developing code for the network request manager, the developer may double-click on a SmartNetworkRequest and write code for that request. This is analogous to the very common practice of double-clicking on a Button control on a form-designer and writing code that will get run when the button is pressed at run-time. Here, the code that the developer writes will get called by the RequestManager when the SmartNetworkRequest's criteria attributes are met. This code corresponds to the work that the developer wants to perform when the criteria are satisfied.

Figure 8:
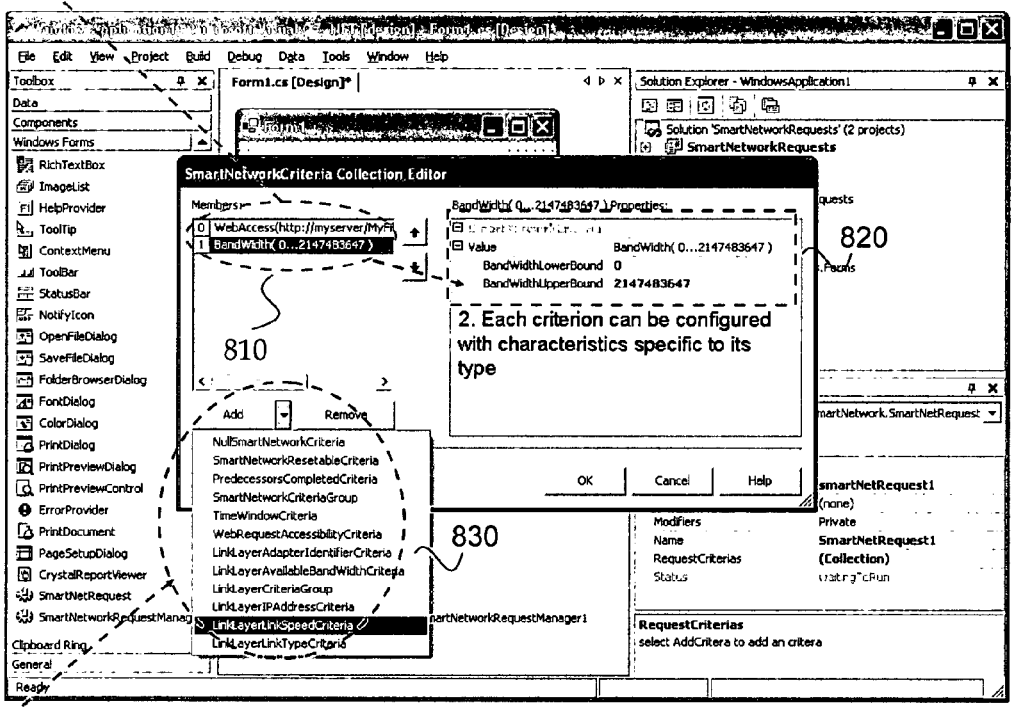
FIG. 8 illustrates a detailed designer view showing the attaching of criteria attributes to a Smart Network Request, in accordance with aspects of the invention.

FIG. 8 illustrates a detailed designer view showing the attaching of criteria attributes to a Smart Network Request, in accordance with aspects of the invention.

Any number of criteria may be associated with a smart network request. As illustrated by ellipses 810 two criteria are currently associated with a network request. A developer may add and delete criteria to a network request through graphical interface 830. Drop down list 830 includes twelve exemplary criteria. As discussed above, there may be many more types of criteria. The user interface may also be used to link the criteria.

Illustrative Operating Environment

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a smart network request design tool 120 that is directed to configuring network request criteria. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. An application using smart network requests resides on mobile computing device 200 and is programmed to interact with a network request manager to execute network requests asynchronously. The application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. The communication connection may configured to connect to any type of wireless network. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for attributing network requests with criteria, comprising:
   creating a network request that is associated with an application on a mobile device; wherein the network request relates to at least one of sending information to another computing device from the mobile device and receiving information from the another computing device on the mobile device; wherein the application specifies criteria that are defined within the application and are associated with network requests made by the application; wherein the network requests are not executed before the criteria specified by the application are satisfied; wherein the criteria comprises: a network connection and a signal strength;
   associating the specified criteria with the network request before the network request is submitted for execution; wherein an application design environment is used to associate the associate the specified criteria with network requests;
   configuring the criteria, wherein configuring the criteria includes adjusting properties relating to the criteria;
   submitting the network request to be performed;
   in response to submitting the network request to be performed, queuing the network request; and
   determining when the criteria that are associated with the network request are satisfied, and when the criteria are satisfied; obtaining the network request from the queue and attempting to execute the request.

2. The method of claim 1, further comprising determining when the execution of the network request succeeds and providing the application with an event indicating the success of the execution of the request.

3. The method of claim 2, further comprising associating event driven code that is executed in response to the event provided to the application.

4. The method of claim 3, further comprising determining when at least two different applications share a common criteria and when the applications share the common criteria then testing the common criteria a single time and sharing the result of the test with each application that shares the common criteria.

5. The method of claim 4, wherein the criteria further comprises link type; time; location; server reachable; IP address; a security token.

6. The method of claim 2, wherein the criteria are logically linked.

7. The method of claim 2, wherein the network request may be executed using different network types.

8. A computer-readable memory device having computer-executable instructions for attributing network requests with criteria, the instructions comprising:
   creating a network request that is associated with an application during the execution of the application ; wherein the application includes instructions that specifies criteria that are associated with all of the network requests made by the application; wherein the network requests are not executed before the criteria specified by the application are satisfied;
   within the application, associating the specified criteria with the network request and configuring the criteria before the network request is submitted for execution, wherein the criteria relates to network link criteria;
   submitting the network request to be performed;
   in response to submitting the network request to be performed, queuing the network request;
   and determining when the criteria that are associated with the network request are satisfied, and when the criteria are satisfied; obtaining the network request from the queue and attempting to execute the request; determining when the execution of the network request succeeds and providing the application with an event indicating the success of the execution of the request.

9. The computer-readable memory device of claim 8, linking at least two of the criteria.

10. The computer-readable memory device of claim 8, wherein determining when the criteria are satisfied comprises determining whether each of the criteria is satisfied one time when the criteria is associated with more than one application.

11. The computer-readable memory device of claim 10, wherein the criteria includes at least one of: bandwidth; link type; time; location; server reachable; IP address; signal strength; a security token.

12. The computer-readable memory device of claim 10, wherein the network request may be executed using more than one type of network.

13. A system for processing network requests, comprising:
a processor and a computer-readable medium;
an operating environment stored on the computer-readable medium and executing on the processor;
an application on a mobile device coupled to a network and operating under the control of the operating environment and operative to perform actions, including to submit network requests for execution, wherein the network requests have associated criteria; wherein the application specifies criteria that are defined during a design of the application and are associated with network requests made by the application; wherein the network requests are not executed before the criteria specified by the application are satisfied;
a network request manager coupled to the application and configured to perform actions, including:
receiving a network request submission from the application;
in response to receiving the network submission, queuing the network request; and
determining when the criteria that are associated with the network request are satisfied; and when the criteria are satisfied: obtaining the network request from the queue and executing the network request asynchronously; determining an outcome of the execution; and
providing an event to the application indicating the outcome of the execution.

14. The system of claim 13, wherein the network request manager is further configured to place the network request in a pending requests queue until it is determined that the criteria are satisfied.

15. The system of claim 14, wherein the network request manager is further configured to move the network request to a success queue when the outcome of the execution indicates success and move the network request to a failure queue when the outcome of the execution indicates failure.

16. The system of claim 13, wherein the application is further configured to activate event driven code that is associated with the outcome of the network request.

17. The system of claim 13, wherein the criteria associated with the network request is selected from at least one of: bandwidth; link type; time; location; server reachable; IP address; signal strength; a security token.

18. The system of claim 14, wherein the network request manager is further configured to determine when criteria span are associated with multiple applications, and when the criteria are associated with more than one application determining whether the criteria is satisfied only one time.

19. The system of claim 13, further comprising a graphical user interface configured to associate the criteria with network requests.

20. The system of claim 19, wherein the graphical user interface is further configured to associate code with the criteria that is to be executed in response to the outcome of the execution of the network request.

* * * * *